United States Patent [19]

Chang et al.

[11] Patent Number: 5,155,174

[45] Date of Patent: Oct. 13, 1992

[54] SURFACE-MODIFIED POLYACRYLONITRILE FIBROUS SUBSTRATES

[75] Inventors: Laurence W. Chang, Orange; Larry S. Anderson, Norwalk; David A. Ley, New Canaan, all of Conn.

[73] Assignee: American Cyanamid Company, Stamford, Conn.

[21] Appl. No.: 552,724

[22] Filed: Jul. 13, 1990

Related U.S. Application Data

[63] Continuation-in-part of Ser. No. 348,454, May 8, 1989, abandoned.

[51] Int. Cl.⁵ .............................................. C08F 8/34
[52] U.S. Cl. ........................... 525/329.1; 8/116.64; 8/115.68; 8/115.69; 525/329.2; 525/329.3; 525/344; 525/366; 525/370; 525/374; 525/375; 525/379; 525/383; 525/386

[58] Field of Search ............ 525/329.1, 329.2, 329.3; 8/115.64, 115.68, 115.69

[56] References Cited

U.S. PATENT DOCUMENTS

| | | | |
|---|---|---|---|
| 3,988,504 | 10/1976 | Halasa | 525/332.8 |
| 4,143,203 | 3/1979 | Rigopulos et al. | 428/407 |
| 4,350,804 | 9/1982 | Ostrowski et al. | 525/329.1 |
| 4,530,974 | 7/1985 | Munro et al. | 525/329.2 |
| 5,059,659 | 10/1991 | Gregor et al. | 525/329.3 |

*Primary Examiner*—Bernard Lipman
*Attorney, Agent, or Firm*—Frank M. Van Riet

[57] ABSTRACT

A surface-modified fibrillated fiber composition is disclosed herein which comprises polyacrylonitrile homopolymer or copolymer and a surface of pendant N-haloamide groups. Also disclosed is a process for the production of said composition.

12 Claims, No Drawings

SURFACE-MODIFIED POLYACRYLONITRILE FIBROUS SUBSTRATES

This application is a continuation-in-part of Ser. No. 07/348,454 filed May 8, 1989, now abandoned.

This application is related to commonly assigned patent applications entitled "Surface-Modified Polyacrylonitrile Substrates" Ser. No. 07/349,569 filed May 8, 1989, and "Surface-Modified Polyacrylonitrile Beads" Ser. No. 07/348,448, filed May 8, 1989, both of Laurence Wu-Kwang Chang, Larry Stanley Anderson and David Arthur Ley.

This application is further related to commonly assigned patent applications of Michael Timothy Cooke and Laura Jean Hiscock for Porous Polyacrylonitrile Beads and Process, Ser. No. 07/275,317 filed Nov. 23, 1988, Michael Timothy Cooke and Laura Jean Hiscock, for Porous Polymer Beads and Process, Ser. No. 07/275,256, filed Nov. 23, 1988, and David Arthur Ley, Laura Jean Hiscock and Michael Timothy Cooke for Process for the Preparation of Porous Polymer Beads, Ser. No. 07/275,170 filed Nov. 23, 1988, as well as Michael Timothy Cooke, Larry Stanley Anderson and David Arthur Ley for Surface-hydrated Porous Polyacrylonitrile Substrates, Such as Beads, Derivatives Thereof, Processes for their Preparation and Methods for their Use, Serial No. 07/276,183, filed Nov. 23, 1988 The contents of these applications are hereby incorporated by reference.

This invention relates to substrates having a core comprising an acrylonitrile polymer or copolymer thereof and N-haloamide groups on the surface thereof; and a process for their production. One embodiment of the present invention is directed to porous isotropic beads of polyacrylonitrile or a copolymer thereof having N-haloamide groups pendant on the surface thereof.

This invention further relates to substrates wherein the aforementioned pendant N-haloamide groups form functionalized substrates. Said functionalized substrates may be used to form complexes with biological substances, thereby permitting, for example, the separation of said substances from solutions in which they are contained.

Substrates produced in accordance with the present invention are useful in various applications including chromatography separation processes.

BACKGROUND OF THE INVENTION

Rigid non-swellable polymeric materials having neutral, hydrophilic surfaces are useful for many applications. These include chromatography supports, membranes, carriers for immobilized enzymes or immunoassay supports. Hydration of polyacrylonitrile surfaces to form acrylamide groups is well known in the art.

U.S. Pat. No. 4,110,529 (Stoy), discloses the introduction of reactive groups into the surface layer of beads during coagulation. Example 5 of the Stoy patent discloses the partial hydration of a polyacrylonitrile to 40 percent amide groups and then coagulation to form porous beads. However, beads prepared in this manner are highly swellable in water and contain a substantial amount of byproduct carboxylate groups in addition to the desired amide groups. Thus, the beads are not particularly useful as chromatographic supports. Their tendency to swell results in excessive pressure drops and inconsistent flow rates in chromatographic columns and the presence of carboxylate groups causes non-specific binding in separation processes not involving ion exchange. Problems also arise from the high (up to 40%) amide conversion rate as high conversion to amide groups results in significant losses in bead strength and chromatographic flow due to loss of bead rigidity.

Other attempts to convert nitrile groups to amides in the prior art have involved treatment with strong acids or bases. However, both of these techniques generally lead to some formation of surface carboxyl groups. For example, U.S. Pat. No. 4,143,203 (Rigopolous) discloses solid particles possessing an impermeable rigid polyacrylonitrile core with a hydrated surface. The surface is hydrated by heating the solid polyacrylonitrile particles in a solution of sulfuric acid at temperatures ranging from 75° to 95° C. However, the beads formed under these conditions are non-porous and also contain a substantial amount of byproduct carboxyl groups. They are therefore not useful in non-ion exchange protein specific chromatographic applications.

The surface modification of polyacrylonitrile under basic conditions was studied by K. Ohta et al., Nippon Kagaku Kaishi, 6. 1200 (1985) using surface infrared spectroscopy. After treating polyacrylonitrile films with 5 percent sodium hydroxide solution for 4 hours at 70° C., Ohta reported finding 4.5 percent amide and 5.7 percent carboxylate groups on the surface of the film. Treatment of the film with a solution of 5 percent sodium hydroxide and 15 percent hydrogen peroxide (an aqueous alkaline peroxide reaction) for 4 hours at 70° C. reportedly produced 2.1 percent amide and 0.7 percent carboxylate. These treatments are therefore not sufficiently selective.

Thus, until recently the state of the art still encountered serious drawbacks to the formation of highly selective non-swellable highly porous acrylonitrile substrates having neutral hydrophilic surfaces. The greater surface area of highly porous beads and the narrow diameter of the polymer structure, makes it critical to accurately control the extent of hydration. Conversion of more than 15 percent of the nitrile groups to amide groups results in significant losses in flow in chromatography separations. It is difficult to accurately control the extent of reaction with acidic hydration. Acidic hydration is also known to have a strong neighboring group effect which generates a "block" polymer structure. A block polymer structure at low conversion can result in non-uniform coverage of the surface. Again, this causes problems with non-specific binding in chromatography applications. A third problem with acidic hydration is the formation of carboxyl and imide groups. The presence of carboxyl groups as previously stated causes undesired ion interactions during size exclusion or affinity chromatography applications.

It has been disclosed in commonly assigned application Ser. No. 07/276,183 that alkaline peroxide hydration of nitriles, with careful control of the solvent utilized, can avoid the aforementioned problems. The reaction selectively converts nitrile groups to amide groups without side reactions to imide or carboxyl groups. By proper selection of the solvent, the reaction can be easily controlled and actually stopped at low conversion. The use of solvent, preferably methanol, allows all of the surfaces of the substrate (as hereinafter defined), to be converted. The process disclosed therein produces an even distribution of amide groups on the surface of the substrate.

The rigid nature of the polyacrylonitrile core is minimally effected by this mild treatment and thus, the substrates are non-compressible and substantially non-swellable in water. When used therein, the term "non-compressible" denoted the resistance to hydrostatic pressures in columnar beds of up to about 3000 psi. without collapsing to prevent flow therethrough.

A method has now been found to convert substrates, such as the surface treated substrates disclosed in above-discussed U.S. Ser. No. 07/276,183, such that said substrate bears pendant N-chloroamide groups on the surface thereof while the core of the substrate remains unreacted. The substrates so produced are useful as intermediates in the production of various surface treated products which bear functional moieties linked to the core of the substrate through reaction of the pendant N-chloroamide group.

SUMMARY OF THE INVENTION

In accordance with the present invention there are provided substrates comprising:

a) a core comprising polyacrylonitrile, or a copolymer of acrylonitrile and at least one comonomer, and b) a surface having evenly distributed thereon N-chloroamide groups and, optionally, nitrile and amide groups.

In a preferred embodiment of the present invention, there is provided a substantially skinless porous bead having a pore-volume of not substantially less than 1.5 ml/g and being substantially isotropic, comprising a core of polyacrylonitrile, or a copolymer thereof, and amide and N-chloroamide groups, and optionally, nitrile groups, evenly distributed over the surface thereof.

Also in accordance with the present invention there is provided a process for the preparation of the aforementioned substrates said process comprising a) contacting a substrate comprising polyacrylonitrile, or a copolymer of acrylonitrile and at least one comonomer with an alkaline catalyst, a peroxide, and optionally a reducing agent, under reaction conditions and for a time sufficient to convert at least a portion of the nitrile groups distributed on the surface of the substrate to amide groups;

b) contacting said substrate with a halogenating reagent under reaction conditions and for a time sufficient to convert at least a portion of the amide groups to N-haloamide groups; and c) recovering the surface-modified substrate.

Also disclosed herein is a process for the preparation of the aforementioned polyacrylonitrile porous bead substrates, said process comprising a) forming a suspension in a liquid non-solvent for the polymer or copolymer beads comprising polyacrylonitrile or a copolymer of acrylonitrile and at least one comonomer;

b) adding an alkaline catalyst, a peroxide and optionally a reducing agent to said suspension and heating for a time sufficient to convert up to about 15 mole percent of the total nitrile groups through hydration to amide groups;

c) recovering said beads from said suspension;

d) contacting said beads with a halogenating reagent under conditions and for a time sufficient to convert at least a portion of said surface amide groups to N-haloamide groups; and e) recovering the surface-modified porous polymer beads.

Also disclosed herein is a composition of matter useful in the recovery and/or isolation of biological material, said composition of matter comprising a) a core comprising polyacrylonitrile, or a copolymer of acrylonitrile and at least one comonomer, and b) a surface having evenly distributed thereon,
   i) pendant bioactive ligand groups, said bioactive ligand groups being bound to said surface through linkages derived from bioactive ligands and N-haloamide groups bound to said surface, and optionally,
   ii) nitrile and/or amide groups.

Further disclosed herein is a process for the production of said compositions of matter useful in the recovery and/or isolation of biological material, said process comprising a) reacting a substrate comprising polyacrylonitrile or a copolymer of acrylonitrile and at least one comonomer with an alkaline catalyst, a peroxide and optionally a reducing agent under reaction conditions and for a time sufficient to convert at least a portion of the nitrile groups distributed on the surface of the substrate to amide groups;

b) reacting said substrate with a halogenating agent under conditions and for a time sufficient to convert at least a portion of said surface amide groups to N-haloamide groups;

c) reacting said substrate with a bioactive ligand such that said bioactive ligand is bound to said substrate through a linkage comprising said N-haloamide groups; and d) recovering said substrate. Also disclosed herein are processes for the recovery and/or isolation of biological material using the above-identified compositions of matter.

DETAILED DESCRIPTION OF THE INVENTION

Substrates comprising polyacrylonitrile homopolymers or copolymers are generally known. For instance, semi-permeable membranes of polyacrylonitrile are utilized in various chemical separations. Hollow fibers of polyacrylonitrile, such as those marketed by Asahi Medical Company Ltd. under the designation PAN 140, are currently used in kidney dialysis equipment.

Porous bead substrates comprising acrylonitrile polymers or copolymers are known to those skilled in the art and utilizable in the practice of the present invention. One method for preparing porous copolymers is described in U.S. Pat. No. 4,246,351. A preferred method of preparing porous polyacrylonitrile beads is disclosed in the above-mentioned commonly assigned copending U.S. patent applications, Cooke and Hiscock, Serial No. 07/275,317,Ley, Hiscock, and Cooke, Serial No. 07/275,170, and Cooke and Hiscock, Serial No. 07/275,256,all of which are filed on Nov. 23, 1988. The thermally induced phase separation process disclosed therein provides microporous beads comprising acrylonitrile polymers or copolymers thereof which are substantially skinless, isotropic, and have a high pore volume. Such porous bead substrates are among the preferred substrates used in the practice of the present invention. Also preferred are polyacrylonitrile substrates such non-porous sheets or films, porous membranes, hollow fibers including porous fibers, monofilaments, acrylic yarns and fibrillated fibers. It should be readily apparent that the form of the substrate is not critical to the practice of the invention disclosed herein.

As mentioned above, the polyacrylonitrile substrates may comprise acrylonitrile homopolymers or copolymers. Suitable comonomers comprise $C_2-C_6$ mono-olefins, vinyl aminoaromatics, alkenyl aromatics, vinyl aromatics, vinyl halides, $C_1C_6$ alkyl(meth)acrylates, acrylamides, methacrylamides, vinyl pyrrolidones, vinyl pyridine, $C_1-C_6$ hydroxyesters of alkyl(meth)acrylates, meth(acrylic)acids, acrylomethylpropylsulfonic acids, N-hydroxy-containing $C_{1-C6}$ alkyl(meth)acrylamide, acrylamidomethylpropylsulfonic acids, vinyl acetate, glycidyl (meth)acrylate, glycerol (meth)acrylate, tris(hydroxymethyl) amino methyl (meth)acrylamide or a mixture thereof. Acrylonitrile trile copolymers may comprise from about 99 to about 20 parts by weight acrylonitrile and from about 1 to about 80 parts by weight comonomer. It is preferable that the acrylonitrile be present in greater than about 90 mole percent and the preferred comonomer comprises methyl acrylate.

As used herein in the physical description of the substrates of the present invention, the term "surface" means the interface of the substrate and non-substrate. The term "core" as used herein denotes that portion of the substrate other than its "surface".

In the practice of the present invention, the surface of the acrylonitrile substrates is initially hydrated such that the surface bears pendant amide groups. This is accomplished by reacting at least a portion of the nitrile groups present on the surface of the substrate with an alkaline peroxide and optionally a reducing agent in a liquid non-solvent for the polymer. The reaction selectively hydrates nitrile groups to amide groups without side reactions to imide or carboxyl groups. The product of this reaction wherein at least a portion of the surface nitrile groups have been converted to amide group is hereinafter referred to as "Substrate I". Furthermore, this initial reaction of the present invention is surprisingly easily controlled and conversions of less than about 15 mole percent nitrile groups to amide groups are readily obtainable. This reaction is generally disclosed in commonly assigned patent application Ser. No. 07/276,183 which is referred to above.

If beads are utilized as the substrate, the process to produce Substrate I comprises forming a suspension of the beads and a non-solvent for the polymer comprising said beads and the pendant polyacrylamide surface which is formed. It is also contemplated to introduce a catalyst into the suspension. The suspension is then stirred and an alkaline reagent added. The suspension is then heated, a peroxide and preferrably a reducing agent is added while the suspension is stirred, and the reaction is carried out to the desired extent.

Suitable peroxides for use in the practice of the present invention include hydrogen peroxide, t-butyl hydroperoxide, or mixtures thereof, and the like. Especially preferred is hydrogen peroxide.

Many alkaline reagents are known to those skilled in the art and are suitable for use in this invention. Alkaline reagents include sodium hydroxide, potassium hydroxide, or mixtures thereof, and the like.

The reducing agent can be any agent capable of reacting with the intermediate hydroperoxide. Especially preferred is dimethyl sulfoxide.

Essential to the practice of the present invention is the choice of a suitable solvent for the reaction. The choice and concentration of the components of the solvent system is believed to control the selectivity and extent of the reaction. Although applicants do not wish to be bound by any theory, it is believed that the ability of the solvent system to dissolve the alkaline reagent and peroxide while having only limited ability to solvate the amide groups as they are formed controls the extent of the reaction. Thus by controlling the ratio of the solvent components, the extent of the reaction can be controlled. Preferably, where hydrogen peroxide is the peroxide utilized and dimethyl sulfoxide is the reducing agent, sodium hydroxide is the alkaline reagent utilized, methanol is employed as solvent with limited ability to solvate the polyacrylacrylamide surface as it is formed.

Following the initial reaction wherein surface nitrile groups are selectively converted to amide groups, Substrate I is then removed from contact with the reagents used in its production. It is preferred that the substrate has at least 2.5% of the nitrile groups found on the substrate surface converted to amide groups. Most preferably, in porous substrates about 10-15% of the total nitrile groups are converted to amide groups.

If porous beads are utilized as the substrate, it is preferred that the beads are annealed prior to their introduction into the suspension with the non-solvent. The annealing step is most preferably carried out as follows: The beads are dried at a temperature of less than 50° C. and then heated to 90°-100 C. for a period ranging from about 30 to about 60 minutes. The annealing appears to decrease the reactivity of the bead. Although applicants do not wish to be bound by any single theory, it is postulated that this decrease in bead reactivity occurs by the polymer becoming more ordered and/or decreasing the surface area. Annealing, thus affects the nitrile to amide ratio and should therefore be anticipated in the practice of the present invention.

Substrate I is then subjected to a second reaction such that at least a portion of said amide groups are converted to N-haloamide groups. A preferred embodiment are the formation of N-chloroamide groups. It is important that this conversion be accomplished without the generation of by-products through reaction of the pendant nitrile groups or other unacceptable degradation of the substrate. In the selection of the solvent for the halogenation reaction, the solvent must be inert to the halogenating agent and a non-solvent for the polymer comprising the substrate. Preferred solvents include water, carbon tetrachloride, tetrachloroethane and chlorobenzene. The halogenation reaction involves the use of the amide-bearing substrate with halogenating agents, such as chlorine gas, t-butyl hypochlorite, chloromonomide, sodium hypochlorite, hypochlorous acid, sodium hypobromite, and mixtures thereof. Typically, the halogenating agents are present in solution in amounts ranging from about 1.0 eq. to about 2.0 eq. based on the amide content of the substrate. Using the formation of N-chloroamides as an example, the chlorinating agents are contacted with Substrate I for sufficient periods to affect the chlorination of the desired portion of the surface amide groups. Typically, contact times range from about 0.5 hours to about 4.0 hours, preferably from about 1 hour to about 3 hours when about 1.25 eq. solutions are employed. The temperature at which the chlorination reaction is conducted is not critical. Typical reaction temperatures range from about 0° to about 40° C., preferably from about 10° to about 30° C.

Conversion of pendant amide groups on surface of Substrate I to N-chloroamide groups may be controlled by limiting the reaction time and the concentration of the chlorinating agent. Preferably, conversions of 25% to about 100% may be accomplished while 50 -90% conversion rates are more typically encountered. For porous substrates, an N-chloroamide content of about 0.5-3.0 mMole/gram is preferred while those possessing a content of about 1.0-2.0 on the identical basis are especially preferred.

Following completion of the reaction to the desired level of halogenation, the substrate (which shall hereinafter be referred to as "Substrate II") is removed from contact with the halogenating agent. Optionally, the substrate may be washed to remove remaining quantities of the halogenating agent. Although optional, this step is particularly desirable when porous substrates are used due to their tendency to retain the halogenating agent in their pores.

Substrate II, produced through the above-described reaction comprises a homopolymeric or copolymeric acrylonitrile core and a surface bearing N-haloamide groups. Optionally and directly dependent upon the degree to which the preceding reactions were carried out, the surface of Substrate II may further bear amide nitrile and the comonomer groups that have not undergone reaction.

Substrate II is particularly well suited, due to the presence of the pendant N-haloamide groups, to use as an intermediate useful in the production of various final products since the chemistry associated with N-haloamide reactions is widely known. N-haloamides are well known to undergo a Hofmann rearrangement to form isocyanates. For instance, U.S. Pat. Nos. 4,301,257, 4,356,289 and 4,357,447 disclose the production of soluble polymeric isocyanates from N-chloroamides. A general discussion of Hofmann rearrangements is further contained in J. March *Advanced Organic Chemistry: Reactions, Mechanisms and Structure* pp 816-817 McGraw Hill, Inc. 1968. For example, *Chemical Reviews*, Volume 72, pp. 457-496 (1972) discusses various reaction schemes which could be employed in the production of numerous products from the isocyanate intermediate formed from Substrate II. For instance, products useful in affinity chromatography, dye affinity chromatography, metal ion affinity, ion exchange, hydrophobic interactions and reverse phase chromatography can be so produced.

Of particular interest is the production of products useful in the area of bioseparations and/or affinity chromatography. These products (hereinafter referred to as "Biosubstrates") are produced through the attachment to Substrate II through the pendant surface N-haloamide groups of functional groups (bioligand) which are capable of binding with biological material. The term "binding" as used herein is to be interpreted broadly to encompass not only covalent bonding but also all less powerful interactions, such as electrostatic forces, van der Waals forces, and hydrogen bonding.

Production of Biosubstrates through attachment of bioligands to Substrate II may be accomplished directly or through the use of an intermediate bridging group which may facilitate such attachment. For instance, bioligands having pendant H$_2$N—, HO—or HS— groups may attach directly to Substrate II. Therefore a cationic exchange resin bearing pendant groups

may be produced through the direct reaction of Substrate II with H$_2$N—R—CO$_2$H where R is, for example, a C$_1$-C$_{18}$ alkylane group.

Methods of binding bioligands to various substrates and their activation, if necessary, are generally known. For example, the following references contain such disclosure, the contents of which are hereby incorporated by reference.

J. Turkova, *Affinity Chromatography*, Journal of Chromatography Library, Elsevier, Vol. 12 pp. 151 -202 (1978).

L. Jervis, *Syntheses and Separations using Functional Polymers*, ed. D. C. Sherrington and P. Hodger, John Wiley and Sons Ltd., pp. 265-304 (1988).

Bioligands, as noted above, are chemical and biological moieties capable of binding with biological materials. The term bioligands, as used herein, also includes moieties which are capable of binding with biological material subsequent to their activation. For example, bioligands having pendant groups, such as —CO$_2$H, —SO$_3$H, —NR$_2$ or —NR$_3$ where R is a C$_{1-6}$ alkyl group, are capable of binding with biological materials by an ion exchange mode. Bioligands having C$_1$-C$_{18}$ alkyl can bind with biological materials by hydrophobic interactions.

In another preferred embodiment, hydrazide functionality can be attached to the surface of the substrates. Hydrazides can couple bioactive ligands either after activation with nitrous acid (J. Turkova, Affinity Chromatography, Journal of Chromatography Library, Vol 12, p. 175, 1978, Elsivier Science Publishers, B.V.) or by site specific reaction with the oxidized carbohydrate portion of immunoglobumins (W. L. Hoffman and D. J. O'Shannessy, J. Immunological Methods, 112, p. 113-120 (1988)). Hydrazide functionality can be introduced by a variety of synthetic routes which can adjust the length of the side-arm. In a preferred method, the N-chloroamide surface can be reacted with either malonic dihydrazide or adipic dihydrazide to produce the hydrazide functionalized surface.

Several alternative methods for creating other spacers arms among which are: reaction of hydroxyl functional surfaces of the present invention with methyl fhloroformate followed by hydrazide; reaction of aldehyde functional surfaces with either malonic or adipic dihydrazide followed by reduction of the Schiff base; or reaction of a primary amine functional surface with succinic anhydride followed by esterification and reaction with hydrazine.

Strongly acidic and basic ion exchange surfaces cal also be prepared. Introduction of sulfonic acid groups may be accomplished by reaction of the N-chloroamide surface with a sulfonic acid-containing compound such as 2-aminoethane sulfonic acid. Quaternary ammonium surfaces can be prepared by quaternization of the tertiary amine surfaces. Alkyl halides or epichlorohydrin are convenient reagents for this reaction.

Alternately, Biosubstrates may be produced wherein the bioligand is bound to Substrate II by way of a bridging group. This is a preferred mode for attachment of bioligands derived from biological material. The identity of the bridging group is not critical in the practice of the present invention. However, it must be at least difunctional and be capable of reaction with both the pendant N-haloamide groups of Substrate II and a bioligand without unduly degrading either or unduly interfering with the performance of the Biosubstrate produced. Bridging groups may consist of various difunctional compounds including polyalkylene glycols, such as polyethylene glycols and polypropylene glycols, preferably those having low molecular weights from 62 to 250; monosacharides, such as fructose, glucose, mannose, ribose, galactose; disaccharides, such as sucrose, maltose, lactose, cellobiose, diamines, such as ethylene diamine, hexamethylene diamine, 1,3-diamino-2-propanol, amino acids, such as glycine, beta-alanine, 6-aminocaproic acid; acyldihydrazides, such as succinic dihydrazide, adipic dihydrazide. The bridging group may have any of the usual chain lengths, being made from difunctional compounds having chain lengths from one to 15 or more atoms between the two reactive functional groups. Bridging groups bearing pendant groups, such as —ROH, —RCO$_2$H, —RNH$_2$, RCHO,

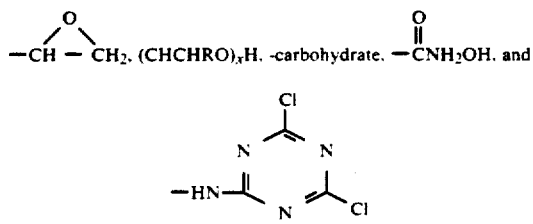

require activation and/or reaction with other bioligands prior to their use as Biosubstrates. A bioligand preferably employed in the practice of the present invention is Protein A.

Bridging groups and their use in the production of Biosubstrates are generally known. For example, the Turkova and Jervis references noted above disclose their usage. Typically, bridging groups comprise aliphatic, aromatic or cycloaliphatic hydrocarbonaceous groups. They may optionally contain heteroatoms, such as O, N or S. Further, the bridging groups typically contain from 1 to about 15 carbon atoms.

In the practice of the present invention, the bridging groups are preferably derived from the following reactants: mono-, di- or trialkylene glycols, alkylene mono-, di- or trialkylene amines, lower diols and polyols, alkanolamines and amino acids. Particularly preferred reactants used in the derivation of a bridging group between a bioligand and Substrate II include ethylene glycol, diethylene glycol, triethylene glycol, glycerol, ethylenediamine, diethylenetriamine, ethanolamine, diethanolamine, 3,3'-diamino-N-methylpropylamine, hexanediamine, glycine, beta-alanine, tris(hydroxymethyl)aminomethane, 6-aminocaproic acid and polyoxyethylenediamine.

Bridging groups can also be formed through sequential reactions in the presence of Substrate II or they may be preformed prior to the reaction with Substrate II.

Particularly preferred as bridging groups in the production of Biosubstrates in the practice of the present invention are the reaction products of:

1) diethylene glycol followed by its reaction with 2-fluoro-1-methylpyridinium-p-toluenesulfonate, and 2) alkylenediamine and succinic anhydride followed by its reaction with N-hydroxysuccinimide, and 3) 6-aminocaproic acid followed by its reaction with N-hydroxysuccinimide.

Following the reaction of Substrate II with a reactant to generate a bridging group or Biosubstrate, remaining N-haloamide functionalities present on Substrate II are typically destroyed, preferably such that less than about 0.1 mMole/gram of active chlorine remains. This may be accomplished through use of heat, treatment with a reducing agent (such as sodium sulfite) or both.

Once produced, Biosubstrates may be utilized in applications where their affinity for and ability to bind with biological material can be utilized. For example, Biosubstrates can be used to isolate biological material from solutions in which it is contained by adding the Biosubstrates to said solutions or by passing said solution over a fixed bed of the Biosubstrate. The Biosubstrate is then isolated from the solution. Optionally, the Biosubstrates can be separated from said solution of biological material to allow for the isolation of the biological material and recycle or reuse of the Biosubstrate.

EXAMPLES

The following examples are presented to illustrate the practice of the present invention. They should not be construed however as limitations of the scope of the present invention.

PROCEDURE A

Five grams of a wet copolymer containing 99 mole percent acrylonitrile and 1 mole percent of methyl acrylate (1:1 copolymer:water by weight) were ground with 5 grams of urea and 30 grams of dimethylsulfone to form a powdered mixture. The mixture was placed in a 1 liter flask containing 100 ml of mineral oil heated to 160° C. The mixture was stirred until two liquid phases were present, one phase being a homogeneous polymer solution, the other mineral oil. Rapid stirring of the mixture with an overhead paddle stirrer gave a suspension consisting of droplets of the hot (about 120° C.) polymer solution in mineral oil. The droplets were cooled by transferring the suspension via a canula to a second stirred mixture consisting of 500 ml of mineral oil, 6 grams of dimethylsulfone, and 1 gram of urea kept at 70° C. The droplets solidified upon contacting the cooler mineral oil The mixture was cooled with stirring to room temperature, then diluted with methylene chloride to reduce the viscosity of the oil. The droplets were collected on a Buchner funnel and washed with methylene chloride, then the solvent was extracted with 200 ml of acetone for 1.5 hours at room temperature. The resulting beads were examined by scanning electron microscopy and seen to be highly porous, with relatively uniform pore diameter of about 0.5 microns. The pores extended through the outer surfaces of the beads. The beads ranged in size from 10 microns to a few millimeters in diameter.

Another detailed example of preparing these porous polymer beads is as follows:

Two-hundred eighty-eight grams of dimethylsulfone, 12 grams of acrylonitrile copolymer consisting of a 99:1 mole ratio acrylonitrile: methyl acrylate, and 100 ml of propylene glycol were combined and placed in a Parr reactor equipped with a magnetically driven stirrer and dip leg. The reactor was heated to 140° C. to form a homogeneous solution. The solution was forced through heated (140° C.) lines and an atomization nozzle (Lechler Co. full cone "center jet" nozzle, 0.46 in. diameter orifice) using 150 psig nitrogen pressure. The nozzle was mounted 3 inches over 3 liters of stirred mineral oil or 4 inches over 4 liters of stirred heptane to quench the liquid droplets. The solidified droplets were washed with heptane to remove mineral oil, dried and extracted for one hour with 3 liters of 85°–90° C. water to produce microporous beads. Pore sizes ranged from 0.05 to 1.5 microns and the majority of the beads are between 25 and 150 microns.

The following examples illustrate the production of Substrate I which bears pendant amide groups.

EXAMPLE 1A

A suspension of 5 grams of dry annealed polyacrylonitrile beads (45-90 microns, 94.5 mmoles) in 115 ml of methanol, 5 ml of water, and 4 ml of dimethylsulfoxide (56.4 mmoles) were stirred under a nitrogen purge. After ten minutes of purging, 2.4 ml of 2N aqueous sodium hydroxide (4.8 mmoles) were added to the suspension and the suspension heated to 35° C. Hydrogen peroxide, 4.9 ml of a 30 percent solution (47.9 mmoles) was added over 10 minutes. The reaction mixture was stirred at 35° C. for three hours. After 3 hours, 2.4 ml of 2N hydrochloric acid (4.8 mmoles) was added and the reaction mixture was stirred for one minute and filtered. The beads were washed with 0.1 N aqueous hydrochloric acid, water, methanol and then dried. The amide content of the beads was determined to be 9.7 percent by infrared analysis.

The following examples illustrate the production of Substrate I which bears pendant amide groups as well as Biosubstrates made therefrom.

EXAMPLE 1B

Dry annealed polyacrylonitrile hollow fibers, 0.5g, were mixed with 11.5 ml of methanol, 0.5g of water, 0.24 ml of 2N aqueous sodium hydroxide solution, and 0.4 ml of dimethyl sulfoxide. The mixture was heated to 35° C., and 0.49 ml of a 30% hydrogen peroxide solution was added. After standing at room temperature for 3 hrs., the reaction mixture was filtered. The fibers were washed with water and methanol and vacuum dried (40° C.). The amide content of the fibers was determined to be 14.1% by infrared analysis.

EXAMPLE 1C

The procedure of Example 1B was followed except that 0.50 g of a non-annealed fibrillated fiber sheet was used with 1.47 ml of 30 percent hydrogen peroxide solution was used, and the fiber was annealed before the reaction. IR analysis showed that the amide content of the MAP fibrillated fiber product was about 2%.

EXAMPLE 1D

The reaction procedure of Example 1B was followed except that 0.52g of a nonporous film made from a 89.5: 10.5 acrylonitrile methyl acrylate film was used and the film was not annealed. Contact angle for water was 42°; initial film had a water contact angle of 63°.

The following Examples illustrate the production of Substrate II which bears pendant N-chloroamide groups as well as the Biosubstrates made therefrom.

EXAMPLE 2

The product of Example 1A, 3g, was mixed with 78 ml of water. To this suspension was added 0.471g of chlorine gas. The addition time of the chlorine was 11 minutes. The reaction mixture was stirred at room temperature for 2 hrs. After 2 hrs. the reaction mixture was filtered. The beads were washed with water and then vacuum dried (40° C.). Iodometric titration showed that the beads contained 1.40 mmole/g of active chlorine corresponding to ca. 80% chlorination of the amide groups on the beads.

EXAMPLE 3

A solution of 130 ml of diethylene glycol (DEG) and 6.3 ml of 2N aq. sodium hydroxide was heated to 40° C. To this solution was added 5g of the product of Example 2. The reaction mixture was stirred at ca. 40° C. for 2 hrs. After two hrs., the reaction mixture was filtered. The beads were washed with water and then vacuum dried (40° C.).

Infrared spectroscopy confirmed that DEG had been reacted with said beads through a Hofmann rearrangement

EXAMPLE 4

The procedure of Example 3 was followed, except that 100 ml of ethylene glycol (EG), 3.3 ml of 2N aq. sodium hydroxide and 2g of the product of Example 2 were used for the reaction Infrared spectroscopy confirmed that EG had been reacted with said beads through a Hofmann rearrangement.

EXAMPLE 5

The procedure of Example 3 was followed, except that 235 ml of triethylene glycol (TEG), 3.8 ml of 2N aq. sodium hydroxide and 3.5g of the product of Example 2 were used.

Infrared spectroscopy confirmed that TEG had been reacted with said beads through a Hofmann rearrangement.

EXAMPLE 6

The procedure of Example 3 was followed except that 100 ml of methanol, 2.3 ml of 2N aq. sodium hydroxide and 2g of the product of Example 2 were used.

Infrared spectroscopy confirmed that methanol had been reacted with said beads through a Hofmann rearrangement.

EXAMPLE 7

The procedure of Example 3 was followed except that 65 ml of glycerol, 2.3 ml of 2N aq. sodium hydroxide, and 2g of the product of Example 2 were used, and 4 ml of water was added to the glycerol solution prior to the addition of the beads Infrared spectroscopy confirmed that glycerol had been reacted with said beads through a Hofmann rearrangement.

EXAMPLE 8

A solution of 90 ml of ethylenediamine (EDA) and 3 ml of water was heated to 40° C. To this solution was added 2g of the product of Example 2. The reaction mixture was stirred at 40° C. for 2 hrs. After two hrs., the mixture was filtered. The beads were washed with water and then vacuum dried (40° C.).

Infrared spectroscopy confirmed that EDA had been reacted with said beads through a Hofmann rearrangement.

EXAMPLE 9

The procedure of Example 8 was followed except that 100 ml of diethylenetriamine (DETA), 3 ml of water, and 2g of the product of Example 2 were used.

Infrared spectroscopy confirmed that DETA had been reacted with said beads through a Hofmann rearrangement.

EXAMPLE 10

The procedure of Example 8 was followed except that 100 ml of ethanolamine (EA), 3 ml of water, and 2g of the product of Example 2 were used.

Infrared spectroscopy confirmed that EA had been reacted with said beads through a Hofmann rearrangement.

EXAMPLE 11

The procedure of Example 8 was followed except that 75 ml of diethanolamine (DEA), 50 ml of water, and 2g of the product of Example 2 were used.

Infrared spectroscopy confirmed that DEA had been reacted with said beads through a Hofmann rearrangement.

EXAMPLE 12

The procedure of Example 8 was followed except that 75 ml of triethanolamine (TEA), 50 ml of water, and 2g of the product of Example 2 were used.

Infrared spectroscopy confirmed that TEA had been reacted with said beads through a Hofmann rearrangement.

EXAMPLE 13

The procedure of Example 8 was followed except that 98 ml of propylamine (PA), 2.5 ml of water, and 2g of the product of Example 2 were used.

Infrared spectroscopy confirmed that PA had been reacted with said beads through a Hofmann rearrangement.

EXAMPLE 14

The procedure of Example 8 was followed except that 100 ml of diethylamine (DEA), 3 ml of water and 2g of the product of Example 2 were used.

Infrared spectroscopy confirmed that DEA had been reacted with said beads through a Hofmann rearrangement.

EXAMPLE 15

The procedure of Example 8 was followed except that 1100 ml of 3,3'-diamino-N-methylpropylamine, 28 ml of water, and 22g of the product of Example 2 were used.

Infrared spectroscopy confirmed that 3,3'-diamino-N-methylpropylamine had been reacted with said beads through a Hofmann rearrangement.

EXAMPLE 16

A mixture of 65g of tris(hydroxymethyl)aminomethane (Tris) and 65g of water was heated in an oil bath; the mixture turned to a clear solution after the temperature of the mixture reached 55° C. The solution cooled to 40° C., and to this solution was added 2g of the product of Example 2. The suspension was stirred at room temperature for two hrs. and then filtered. The beads were washed with water and vacuum dried (40° C.)

Infrared spectroscopy confirmed that tris(hydroxymethyl)aminomethane (Tris) had been reacted with said beads through a Hofmann rearrangement.

EXAMPLE 17

The procedure of Example 8 was followed except that 100 ml of 3-diethylaminopropylamine, 2.0 ml of water and 2.5g of the product from Example 2 were used, and the reaction mixture was stirred at 40° C. for 3 hours. Potentiometric titration of the beads using aq. hydrochloric acid revealed that the beads contained 0.86 meq/g of the amino group.

Infrared spectroscopy confirmed that diethylaminopropylamine had been reacted with said beads through a Hofmann rearrangement.

EXAMPLE 18

To 260 ml of a 0.2N aq. sodium hydroxide solution was added 10 g of the product of Example 2. The suspension was stirred at room temperature for 3 hrs. and then filtered. The beads were washed with water and vacuum dried (40° C.). Potentiometric titration using aq. hydrochloric acid showed that the beads contained 0.33 meq/g of the carboxylic group.

EXAMPLE 19

A solution containing 50g of dextran (mol. wt. 15,000) and 50 ml of water was heated to 40° C. To this solution was added 10 g of the product of Example 2 and 5 ml of 2N aq. sodium hydroxide solution. The suspension was stirred at 42° C. for 3 hrs. and then filtered. The beads were washed with water and vacuum dried. Analysis using anthrone method (Anal. Chem. 25, 1656, (1953)) showed that the beads contained 3% by wt. dextran.

Infrared spectroscopy confirmed that said functional groups had been reacted with said beads through a Hofmann arrangement.

EXAMPLE 20

The procedure of Example 8 was followed except that 130 ml of polyoxyethylenediamine (Jeffamine EDR-148), 3 ml of water and 5g of the product of Example 2 were used.

Infrared spectroscopy confirmed that poloxyethylenediamine had been reacted with said beads through a Hofmann rearrangement.

EXAMPLE 21

A solution of 117 ml of decylamine and 2.7 ml of water was heated to 40° C. To this solution was added 4.5g of product of Example 2. The suspension was stirred at 40° C. for 2 hrs. and then filtered. The beads were washed with acetone and hexanes and vacuum dried (40° C.).

Infrared spectroscopy confirmed that decylamine had been reacted with said beads through a Hofmann rearrangement.

EXAMPLE 22

A mixture of 10 g of octadecylamine and 15 ml of hexadecane was heated in an oil bath. The mixture turned to a clear solution when the temperature of the mixture reached 60° C. To this solution was added 0.6 ml of water and 1.25g of the product of Example 2. The mixture was stirred at 62° C. for 75 minutes and then filtered. The beads were washed with heptane and vacuum dried (40° C.).

Infrared spectroscopy confirmed that octadecylamine had been reacted with said beads through a Hofmann rearrangement.

EXAMPLE 23

A solution of 75 ml of dioxane (dried over 3A molecular sieving) and 10.5g of carbonyldiimidazole was purged with nitrogen. The solution was then heated to 35° C., and to this solution was added 3.5g of the product of Example 3. The suspension was stirred at 35° C. under nitrogen atmosphere for 1.5 hrs. and then filtered. The beads were washed with acetone, cold water, THF and acetone and vacuum dried at room temperature.

Infrared spectroscopy confirmed that carbonyldiimidazole had been reacted with said beads.

EXAMPLE 24

A suspension of 10 g of ethylenediamine urea beads (the product of Example 8), and 90 ml of 0.1N sodium chloride was immersed in a 4° C. ice bath. Powdered succinic anhydride (40 g) was slowly added with constant stirring over 2 hrs. The pH was maintained at 6.0 with the addition of 5N NaOH and the temperature was kept between 4° C. and 10° C. After the succinic anhydride addition, the temperature was maintained at 4° C. and the pH was kept at 6.0 for an additional 4 hrs. The beads were collected, washed with 1.0N hydrochloric acid, water, and methanol, and then vacuum dried. Titration results showed 145 micromoles of carboxyl groups/ml of beads.

EXAMPLE 25

Succinylated ethylenediamine urea beads (prepared as in Example 24), 2.0 mls, containing 114 micromoles of carboxyl groups/ml, were dehydrated in p-dioxane. The beads were collected and added to 5 ml of dry p-dioxane. N-Hydroxysuccinimide, 500 micromoles, was added followed by 500 micromoles of dicyclohexylcarbodiimide. Non-solvents for acrylonitrile polymers or copolymers may comprise any liquid medium which is immiscible therewith. These were tumbled overnight, collected, and washed with dry p-dioxane and methanol. The activation density was 37 micromoles/ml (determined by the method of T. Miron and M. Wilchek, Analytical Biochemistry, 126, 433-435 (1982)).

The following examples illustrate the attachment of bioligands or other functional groups to Substrate II through various bridging groups.

EXAMPLE 26

Succinylated ethylenediamine urea beads (prepared as in Example 24), 0.25 g, containing 114 micromoles of carboxyl groups/ml, were added to 2.5 ml of 0.1N NaCl. Ethylenediamene dihydrochloride, 0.45 g, was added and the pH was adjusted to 4.7 with 0.1N NaOH 1-(3-dimethylaminopropyl)-3-ethylcarbodiimide hydrochloride (EDAC), 0.049, was added, and this was tumbled 24 hrs. at room temperature while maintaining the pH at 4.7. The beads were collected, washed with 0.1N HCl, water, and methanol, and then vacuum dried. These beads contained 98 moles amine/ml (determined by the method of G. Antoni, et al., Analytical Biochemistry, 129, 60-63 (1983)).

EXAMPLE 27

The dehydrated product of Example 3, 10 mls, was added to 10 ml of dry acetonitrile containing 5500 micromoles of 4-dimethylaminopyridine (DMAP). 2-Fluoro-1-methyl-pyridinium toluene-4-sulfonate (FMP) 5,000 micromoles, in dry acetonitrile, 25 ml, was added directly to the bead mixture. This was tumbled 2 hrs. at room temperature. The beads were washed 1×100 ml acetonitrile, 2×100 ml acetone, and stored at 4° C. in 30 ml of dry acetone. The beads contained 112 micromoles of activated hydroxyl groups/ml, as assayed by the amount of 1-methyl-2-pyridone released when the beads were tumbled 24 hr. at room temperature in 0.2N sodium hydroxide (see T. Ngo, Bio/Technology, Vol. 4, 134-137 (1986), for the spectrophotometric assay procedure).

The product produced was identified as a polymer containing 1-methyl-2-pyridoxal toluene-4-sulfonate (MPTS) groups.

EXAMPLE 28

The procedure of Example 27 was followed except that 3.5 ml of the product of Example 12 was reacted with 1925 micromoles of DMAP in 3.5 ml of acetonitrile, and 1750 micromoles of FMP in 8.9 ml of acetonitrile. The density of activation was 27.3 micromoles/ml.

The product produced was identified as a polymer containing MPTS groups.

EXAMPLE 29

The procedure of Example 27 was followed except that 5.5 ml of the product of Example 50 was reacted with 3025 micromoles of DMAP in 5.5 ml of acetonitrile, and 2750 micromoles of FMP in 13.8 ml of acetonitrile. The density of activation was 15.5 micromoles/ml.

The product produced was identified as a polymer containing MPTS groups.

EXAMPLE 30

The procedure of Example 27 was followed except that 2.0 ml of the product of Example 16 was reacted with 1100 micromoles of DMAP in 2.0 ml of acetonitrile, and 1000 micromoles of FMP in 5.0 ml of acetonitrile. The density of activation was 18.8 micromoles/ml.

The product produced was identified as a polymer containing MPTS groups.

EXAMPLE 31

The procedure of Example 30 was followed except that a solution of 40% dimethylsulfoxide, 60% acetonitrile was used in place of acetonitrile. The density of activation was 28.5 micromoles/ml.

The product produced was identified as a polymer containing MPTS groups.

EXAMPLE 32

The procedure of Example 27 was followed except 10 ml of the product of Example 7 was used. The density of activation was 23.7 micromoles/ml.

The product produced was identified as a polymer containing MPTS groups.

EXAMPLE 33

The procedure of Example 27 was followed except 10 ml of the product of Example 5 was used. The density of activation was 70.1 micromoles/ml.

The product produced was identified as a polymer containing MPTS groups.

EXAMPLE 34

The dehydrated product of Example 3, 6 ml, was added to 18 ml of dry acetone. p-Nitrophenylchloroformate, 6000 micromoles, was added and the mixture was immersed in a 4° C. ice bath. DMAP, 7200 micromoles in 10 ml of dry acetone, was added dropwise, and the contents were tumbled for 1 hr. at 4° C. The beads were collected and washed with cold acetone, 5% acetic acid in dioxane, methanol, and isopropanol, and stored at 4° C. in isopropanol. The density of activation was 20.1 micromoles/ml (determined by the method of T. Miron and M. Wilchek, Biochemistry International, Vol. 4, No. 6, 629-635 (1982)).

The product produced was identified as a polymer containing p-nitrophenyl formate groups.

EXAMPLE 35

The dehydrated product of Example 3, 2.5 ml, was added to 4 ml of dry acetone containing 2500 micromoles of N,N'-disuccinimidyl carbonate. A solution of 4250 micromoles of DMAP in 5 ml of acetone was slowly added. The suspension was tumbled for 1 hr. at 4° C. The beads were collected and washed with cold acetone, 5% acetic acid in dioxane, methanol, and isopropanol. The activated beads were stored in 4° C. isopropanol. The density of activation was 28.5 micromoles/ml (determined by the method of M. Wilchek and T. Miron, Applied Biochemistry and Biotechnology, Vol. 11, 191-193 (1985)).

The product produced was identified as a polymer containing active hydroxy succinimide carbonate (HSC) groups.

EXAMPLE 36

The procedure of Example 35 was followed except the product of Example 5 was used. The density of activation was 25.6 micromoles/ml.

The product produced was identified as a polymer containing active HSC groups.

EXAMPLE 37

The product of Example 27, 0.50 ml, was washed $3 \times 10$ ml water, $1 \times 3$ ml 0.05N sodium carbonate/sodium bicarbonate, pH 8.5 (coupling buffer). The coupling buffer, 1.20 ml, containing 50 mg of bovine serum albumin (BSA) was added to the beads. After tumbling for 24 hrs. at room temperature, the beads were washed with $4 \times 10$ ml 1.0N NaCl, and $3 \times 10$ ml water. The beads coupled 8.1 mg BSA/ml (determined from protein concentration in combined washings, using the Pierce BCA Protein Assay).

The product produced was identified as a polymer with immobilized BSA.

EXAMPLE 38

The procedure of Example 37 was followed except the product of Example 28 was used. The beads coupled 5.8 mg BSA/ml.

The product produced was identified as a polymer with immobilized BSA.

EXAMPLE 39

The product of Example 35, 0.50 ml, was washed with 4° C. water and 4° C. 0.1N phosphate buffer, pH =7.5 (coupling buffer). Bovine serum albumin, 50 mg, in 1.20 ml of coupling buffer was added. This was tumbled at 4° C. for 24 hrs The beads were washed with $4 \times 40$ ml 1.0N NaCl, $3 \times 10$ ml water. The beads coupled 5.5 mg BSA/ml (determined from the protein concentration in the combined washings, using the Bio-Rad Protein Assay).

EXAMPLE 40

The procedure of Example 37 was followed except that the product of Example 33 (prepared with a lower density of activation of 16 micromoles/ml), 2 ml was used. Cytochrome C, 12.2 mg, in 2.7 mls of 0.2N NaHCO$_3$ pH =9.0, was added to the beads. These beads coupled 1.5 mg Cytochrome C/ml (determined from Bio-Rad Protein Assay).

EXAMPLE 41

The procedure of Example 40 was followed except the product of Example 27 (prepared with a lower degree of activation of 25 micromoles/ml) was used. The beads coupled 2.9 mg Cytochrome C/ml (determined by the Bio-Rad Protein Assay).

The following examples illustrate the practice of the present invention wherein substrates other than beads are utilzed.

EXAMPLE 42

The product of Example 1B, 0.24g, was mixed with 14 ml of water. To this mixture was added 0.066g of chlorine in 4 minutes. After standing at room temperature for 1.5 hrs., the reaction mixture was filtered. The fibers were washed with water and vacuum dried (40° C.) Iodometric titration showed that the fibers contained 1.92 mmole/g of active chlorine.

EXAMPLE 43

A solution of 5 ml of diethylene glycol and 0.2 ml of 2N aqueous sodium hydroxide solution was heated to 40° C. To this solution was added 0.12g of the product of Example 42. The reaction mixture was heated at 42° C. for 2 hrs. and then filtered. The fibers were washed with water and vacuum dried.

Infrared spectroscopy revealed that diethylene glycol had reacted with the fibers by way of a Hofmann rearrangement.

EXAMPLE 44

The product of Example 1C, 0.41g, was mixed with a solution of 20 ml of water and 0.10 g of chlorine. After standing at room temperature for 2hrs., the reaction mixture was decanted. The fiber was washed with water and vacuum dried (40° C.). Iodometric titration showed that the fiber contained 0.70 mmole/g of active chlorine.

EXAMPLE 45

A solution of 15 ml of DEG and 0.4 ml of 2N aqueous sodium hydroxide solution was heated to 40° C. To this solution was added 0.3g of the product of Example 44. After standing at 40° C. for 3 hrs., the reaction mixture was decanted, and the fiber was washed with water and methanol and vacuum dried (40° C.).

Infrared spectroscopy revealed that diethylene glycol had reacted with the fibers by way of a Hofmann rearrangement.

EXAMPLE 46

The procedure of Example 44 was followed and the product of Example 1D, 0.38g, was used for the reaction to produce a nonporous acrylonitrile copolymer film having pendant N-chloroamide groups therefrom.

EXAMPLE 47

A mixture of 0.05g of the product of Example 46, 10 ml of decylamine, and 0.2 ml of water was heated at 40° C. for 3 hrs. The reaction mixture was then decanted The film was washed with heptane several times and vacuum dried (room temperature). Water contact angle for the film was 107°.

EXAMPLE 48

A mixture of 5g of tri(hydroxymethyl)aminomethane and 5g of water was heated to 55° C., and the mixture turned to a clear solution. The solution cooled to 50° C., and to this solution was added 0.12g of the product of Example 46. After standing at 43° C. for 3 hrs., the reaction mixture was decanted. The film was washed with water and methanol and air dried. The water contact angle was 54°.

EXAMPLE 49

The procedure of Example 27 was followed except that 0.0585g of the product of Example 43 was reacted with 320 micromole of DMAP in 0.582 ml of dry acetonitrile, and 290 micromoles of FMP in 1.450 ml of dry acetonitrile. The density of activation of the resulting product was 241.0 micromole/g.

EXAMPLE 50

The procedure of Example 8 was followed except 26 ml of N-methyldiethanolamine, 0.70 ml of water, and 1.0g of the product of Example 2 were used.

Infrared spectroscopy confirmed that the N-methyldiethanolamine had reacted with the substrate through a Hofmann rearrangement.

EXAMPLE 51

The procedure of Example 8 was followed except that 3g of the product of Example 2, 100 ml of N,N-diethylethylenediamine (DEAE) and 2 ml of water were used and the reaction mixture was stirred at 45° C. for 3 hrs.

Infrared spectroscopy confirmed that DEAE had been reacted with said beads through a Hofmann rearrangement. Potentiometric titration using aqueous hydrochloric acid showed that the beads contained 1.03 meq/g of the amino group.

EXAMPLE 52

A mixture of 52 g of glycine and 52 ml of 35% (w/w) aqueous sodium hydroxide was heated to 35° C. and a clear solution was obtained The this solution was added 4g of the product of Example 2. The suspension was stirred at 40° C. for 3 hrs and then filtered. The beads were washed with 0.1N aq. sodium hydroxide, and water and vacuum dried.

Infrared spectroscopy confirmed that glycerine had reacted with said beads through a Hofmann rearrangement. Potentiometric titration showed that the beads contained 1.20 meq/g of the carboxylate group.

EXAMPLE 53

The procedure of Example 52 was followed except that 3g of the product of Example 2, 39g of beta-alanine and 35 ml of 35% (w/w) aq. sodium hydroxide were used.

Infrared spectroscopy confirmed that the beta-alanine had reacted with said beads through a Hofmann rearrangement. Potentiometric titration showed that the beads contained 1.23 meq/g of the carboxylate group.

EXAMPLE 54

The procedure of Example 52 was followed except that 3 g of the product of Example 2, 42g of 6-aminocaproic acid, 23ml of 35% (w/w) aq. sodium hydroxide were used, and before heating to 35° C., 16 ml of water was added to the mixture of 6-aminocaproic acid and 35% aq. sodium hydroxide.

Infrared spectroscopy confirmed that the 6-aminocaproic acid had reacted with said beads through a Hofmann arrangement. Potentiometric titration showed that the beads contained 1.09 meq/g of the carboxylate group.

EXAMPLE 55

The product of Example 45, 0.10 g, was washed 3×40 ml dry acetone, 5×40 ml dry acetonitrile, and the solvent was removed. The fibrillated fibers were added to 8 ml of dry acetonitrile containing 0.07 g of 4-dimethylaminopyridine. 2-Fluoro-1-methyl-pryidinium p-toluene-sulfonate (FMP), 0.14 g, in 2.6 ml of dry acetonitrile was added all at once and the solution was tumbled for 2 hours at room temperature. The fibers were collected and washed 1×50 ml acetonitrile, and 2×100 ml acetone. The fibers contain 127 umoles of activated hydroxyl groups/gram, when assayed with 0.2N sodium hydroxide (see Example 27 for assay procedure). The fiber product was demonstrated to contain MPTS groups.

The following examples illustrate the use of various Biosubstrates produced in accordance with the present invention.

EXAMPLE 56

The product of Example 55, 0.6 g, was washed 3×13 ml distilled water, and 1.13 ml 0.05N sodium carbonate, pH =8.5 (coupling buffer). The buffer was removed and 6.4 ml of coupling buffer containing 100 mg of bovine serum albumin (BSA) was added. This was tumbled at room temperature for 3 hours, and then at 4° C. for 2 days. The fibers were washed 3×100 ml of coupling buffer and 4×100 ml of 1.0N sodium chloride. The fibers coupled 4.44 mg BSA (7.3 mg BSA/g of fiber). This was determined by performing the Pierce BCA*Protein Assay directly on the fiber.

EXAMPLE 57

The product of Example 27, 1 ml (prepared with 31 micromoles activated hydroxyl groups/ml of bead), was washed 3×10 ml water, 1×10 ml 0.05N sodium carbonate, pH =8.5 (coupling buffer). The coupling buffer was removed and 1 ml of degassed coupling buffer containing 8 mg of protein A was added. This was tumbled 24 hours at room temperature and then 24 hours at 4° C. The beads were washed with 3 ml of 0.05N sodium chloride, and then a 75/25 methanol/water (v/v) solution over ½ hour. After washing 1×10 ml 0.01N sodium acetate, pH =4.5, the beads were stored at 4° C. in 0.01N Tris-HCl, 0.1% sodium azide, pH =8.5. The beads were shown to have coupled Protein A.

EXAMPLE 58

The product of Example 55, 1.2 g, was reacted with 8 mg of Protein A following the procedure of Example 57, except that a 5 fold solution volume was used to allow complete wetting of the fibers. The beads were shown to have coupled Protein A.

EXAMPLE 59

The product of Example 57, (1 ml) was suspended in phosphate buffered saline (PBS), (0.10M sodium phosphate, 0.9% sodium chloride, 0.01% sodium azide, pH =7.4), and packed into a 5 ml chromatography column.

The beads were washed with 5 ml of a 0.1% acetic acid in 10% methanol buffer (Regeneration Buffer) and then 15 ml of PBS (Binding Buffer), at flow rates of 40 ml/hr. Normal human serum (NHS) was diluted 1 part NHS to 2 parts binding buffer and filtered. 12 ml of the diluted NHS was gravity fed through the column. After washing the beads with 20 ml of binding buffer, purified IgG was eluted with a 0.1N glycine, pH = 2.8 buffer. Using the extinction coefficient at 280 nm of a 1% solution of human IgG of 13.5, the binding capacity of the beads was shown to be about 27.0 mg IgG/ml of beads.

EXAMPLE 60

The fibrillated fiber product (0.36 g) of Example 62, cut into three 162" circles, (0.36 g), and were packed into a cartridge (Millipore). The fibers were checked for IgG binding following the procedure of Example 59. The binding capacity was shown to be about 9.1 mg IgG/gram of fibers.

EXAMPLE 61

The procedure of Example 3 was followed except that 15 grams of 1,6-hexanediamine, 13.7g of diethylene glycol, 1.0 ml of water, and 1.0g of the product of Example 2 were used. These beads contained 169 micromoles of amine/ml of bead when determined by the method of Example 26.

EXAMPLE 62

Following the procedure of H. J. Bohme, et al., (J. of Chromatography, 69 (1972) 209-214), 0.4 g of Cibacron Blue F3G-A (Sigma) in 12 ml of water was added to 2 g of the product of Example 3 in 70 ml of 60° C. water. This was stirred for ½ hour and then 9 g of sodium chloride was added. This was heated to 80° C. and then 0.8 g of sodium carbonate was added. This was stirred for 2 hours, and then the beads were collected and washed with water and methanol to give dark blue beads. It was determined that the Cibacron Blue dye had been bonded to the beads through a urethane-DEG linkage.

EXAMPLE 63

Underivatized fibrillated fiber, 0.5 g, was washed five times with 10 ml solutions of 1.ON NaCl, DI water and 3×10 ml phosphate buffered saline (PBS), (0.01 M sodium phosphate, 0.9% sodium chloride, 0.01% sodium azide, pH = 7.4). PBS, 10 ml, containing 100 mg of BSA was contacted with the fibers and this was tumbled at room temperature for 1 hour. The fibers were washed with 4×10 ml distilled water and with 10×10 ml of PBS. The assay for protein using the Pierce BCA* Protein Assay Reagent directly on the fiber showed 1.2 mg of BSA non-specifically bound to the fiber (2.4 mg BSA/gram of fiber).

EXAMPLE 64

The procedure of Example 64 was followed except 0.5 g of the product of Example 45 was used. This fiber showed no non-specifically bound BSA.

EXAMPLE 65

A 1.13 g sample of spun acrylic yarn was treated as disclosed in Example 1. The examination of the surface by ESCA revealed the presence of amide groups.

EXAMPLE 66

The product of Example 27, 1.0 ml, prepared with 33 micromoles of activated hydroxyl groups/ml, was coupled with BSA following the procedure of Example 37, except that 25 mg of BSA was added/ml of beads. The amount of coupling was 3.5 mg BSA/ml of beads.

EXAMPLE 67

The procedure of Example 66 was repeated, except that a 40% Ethanol, 60% coupling buffer (v/v), was used. The amount of coupling was 13.3 mg BSA/ml of beads.

EXAMPLE 68

The procedure of Example 2 wasw followed except that a reduced amount of chlorine gas was used to produce a product with 0.27 meq of N-chloroamide per gram of product. A solution of 37.5 grams of malonic dihydrazide and 82.5 grams of water to 45 degrees C. and stirred until the dihydrazide dissolved. Triethylamine, 0.31 grams and 7.5 grams of the above N-chloroamide product were added and allowed to stir for two hours at 45 degrees C. The product was then collected on a Buchner funnel and washed with warm water, cold water, 0.1 N HCl and cold water. Colorimetric assay showed 20 microequivalents of hydrazide bound per mL of resin

EXAMPLE 69

The product of Example 7 was tumbled for 3 hours in a solution of 0.001 N sodium periodate in 0.1N acetate buffer, pH 5.0. The reaction was followed by disappearance of the periodate. The product was collected and washed with 0.05 N acetate buffer (pH 5.0) to give beads with an aldehyde functional surface.

EXAMPLE 70

The product of Example 69 was added to a solution of 0.001 N adipic dihydrazide in 0.05 N acetate buffer (pH 5.0). The suspension was tumbled for 4 days at room temperature, collected, and washed with water. The TNBS hydrazide assay showed the presence of about 12 micromoles of hydrazide per mL of beads.

EXAMPLE 71

A mixture of 62 grams of 2-aminoethane sulfonic acid, 36 mL of 35% by weight of aqueous sodium hydroxide and 20 mL of water was heated to 50 degrees C. until a clear solution was obtained. The solution was cooled to 43 degrees C. and 5 grams of the product of Example 2 was added thereto. Stirring was continued for 3 hours at 40 degrees C. The product was collected and washed with water, 0.5 N sodium hydroxide, water, methanol and then air dried. Infrared spectroscopy confirmed the presence of sulfonic acid groups, potentiometric titration showed 0.96 meq per gram of product.

EXAMPLE 72

To a solution of 10 grams of ethyl chloride in 70 mL of methanol is added 3 grams of the product of Example 51. The suspension is stirred at room temperature for 3 hours. The product is then collected and washed with water. Analysis reveals the presence of a quaternary ammonium functional surface.

EXAMPLE 73

The procedure of Example 37 was followed except that fetuin was used instead of BSA, two different FMP activation loadings were used and the coupling reaction was conducted for about 40 hours. The Pierce BCA Protein Assay was then conducted to show that the beads respectively possessed 44 and 123 micromoles of activated hydroxyl groups per ml and 3.9 and 7.0 mg of bound fetuin per ml.

We claim:

1. The product produced by the process comprising;
   a). contacting fibrillated fibers comprising acrylonitrile, or a copolymer of acrylonitrile and at least one comonomer, with an alkaline catalyst, a peroxide, and optionally a reducing agent under reaction conditions and for a time sufficient to convert at least a portion of the nitrile groups distributed on the surface of the fibers to amide groups;
   b). reacting said fibers with a halogenating reagent under conditions and for a time sufficient to convert at least a portion of the amide groups to n-haloamide groups:
   c) reacting said fibers with a bioactive ligand selected from the group consisting of carboxylic acids, sulfonic acids, tertiary amines, quaternary amines, peptides, hormones, enzymes, enzyme cofactors, enzyme substrates, enzyme inhibitors, antigens, antibodies, dyes pigments, complex metal ions, proteins, nucleic acids, p-aminobenzamidine, polysaccharides, lectins, toxins, and antitoxins, under conditions and for a time sufficient to effect the bonding of said ligand to said fibers through said n-haloamide group and
   d) recovering the surface-modified fibers.

2. A composition of matter comprising:
   a) fibrillated fibers comprising polyacrylonitrile or a copolymer of acrylonitrile and at least one comonomer, and
   b) a surface having evenly distributed thereon,
      i) pendant bioactive ligand groups selected from the group consisting of carboxylic acids, sulfonic acids, tertiary amines, quaternary amines, peptides, hormones, enzymes, enzyme cofactors, enzyme substrates, enzyme inhibitors, antigens, antibodies, dyes pigments, complex metal ions, proteins, nucleic acids, p-aminobenzamidine, polysaccharides, lectins, toxins, and antitoxins, said bioactive ligand groups being bound to said surface through linkages derived from the reaction of bioactive ligands and n-halomide groups bound to said surface, and, optionally,
      ii) nitrile and/or amide groups.

3. The composition of claim 2 wherein said fibers comprise a copolymer of polyacrylonitrile wherein the polyacrylonitrile content of said fibers range from about 29 to 99 parts by weight.

4. The composition of claim 3 wherein the polyacrylonitrile content of said fibers range from about 50 to about 98 parts by weight.

5. The composition of claim 2 wherein said comonomer is selected from the group consisting of $C_2-C_6$ mono-olefins, vinyl aminoaromatics, alkenyl aromatics, vinyl aromatics, vinyl halides, $C_2-C_6$ alkyl(meth)acrylates, acrylamides, methacrylamides, vinyl pyrrolidones, vinyl pyridine, $C_1-C_6$ hydroxesters of alkyl(meth)acrylates, meth(acrylic)acids, acrylomethylpropylsulfonic acids, N-hydroxy-containing $C_1-C_6$ alky(meth)acrylamide, acrylamidomethylpropylsulfonic acids vinyl acetate, glycidyl (meth)acrylate, glycerol (meth)acrylate, tris(hydroxymethyl)aminomethyl (meth)acrylamide and mixtures thereof.

6. The composition of claim 2 wherein said fiber comprises a copolymer of acrylonitrile and methyl acrylate wherein said acrylonitrile comprises at least 90 mole percent of said copolymer.

7. The composition of claim 2 wherein said N-haloamide groups are selected from the group consisting of N-chloroamide, N-iodoamide and N-bromoamide groups.

8. The composition of claim 2 wherein said N-haloamide groups comprise N-chloroamide and N-bromoamide groups.

9. The composition of claim 2 wherein said bond of said bioligand and said fiber further comprises a bridging group.

10. The composition of claim 2 wherein said bridging group is selected from the group consisting of $C_1-C_{15}$ aliphatic, aromatic, cycloaliphatic groups which optionally contain heteroatoms, such as O, N or S.

11. The composition of claim 2 wherein said bridging group is selected from the group consisting of ethylene glycol, diethylene glycol, triethylene glycol, glycerol, ethylenediamine, diethylenetriamine, ethanolamine, diethanolamine, 3,3'-diamino-N-methylpropylamine, hexanediamine, glycine, beta-alanine, tris(hydroxymethyl) aminomethane, 6-aminocaproic acid and polyoxyethylenediamine.

12. A composition of matter comprising the composition of claim 2 and biological material bound to said composition.

* * * * *